Figure 1:
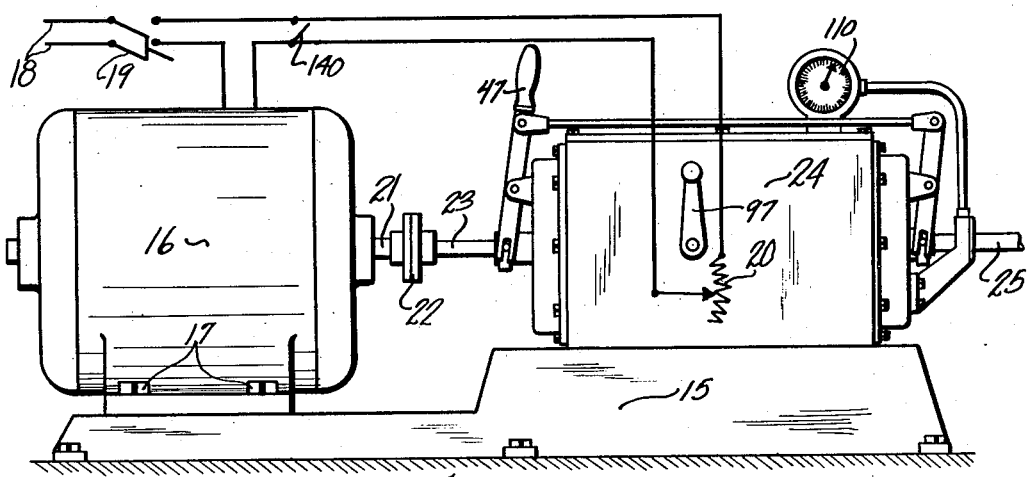

Dec. 18, 1934.  E. S. BUSH  1,985,017
VARIABLE SPEED TRANSMISSION APPARATUS
Filed Feb. 23, 1933  4 Sheets-Sheet 1

INVENTOR.
EUGENE S. BUSH
BY
*Ellers & Schamberg*
ATTORNEYS

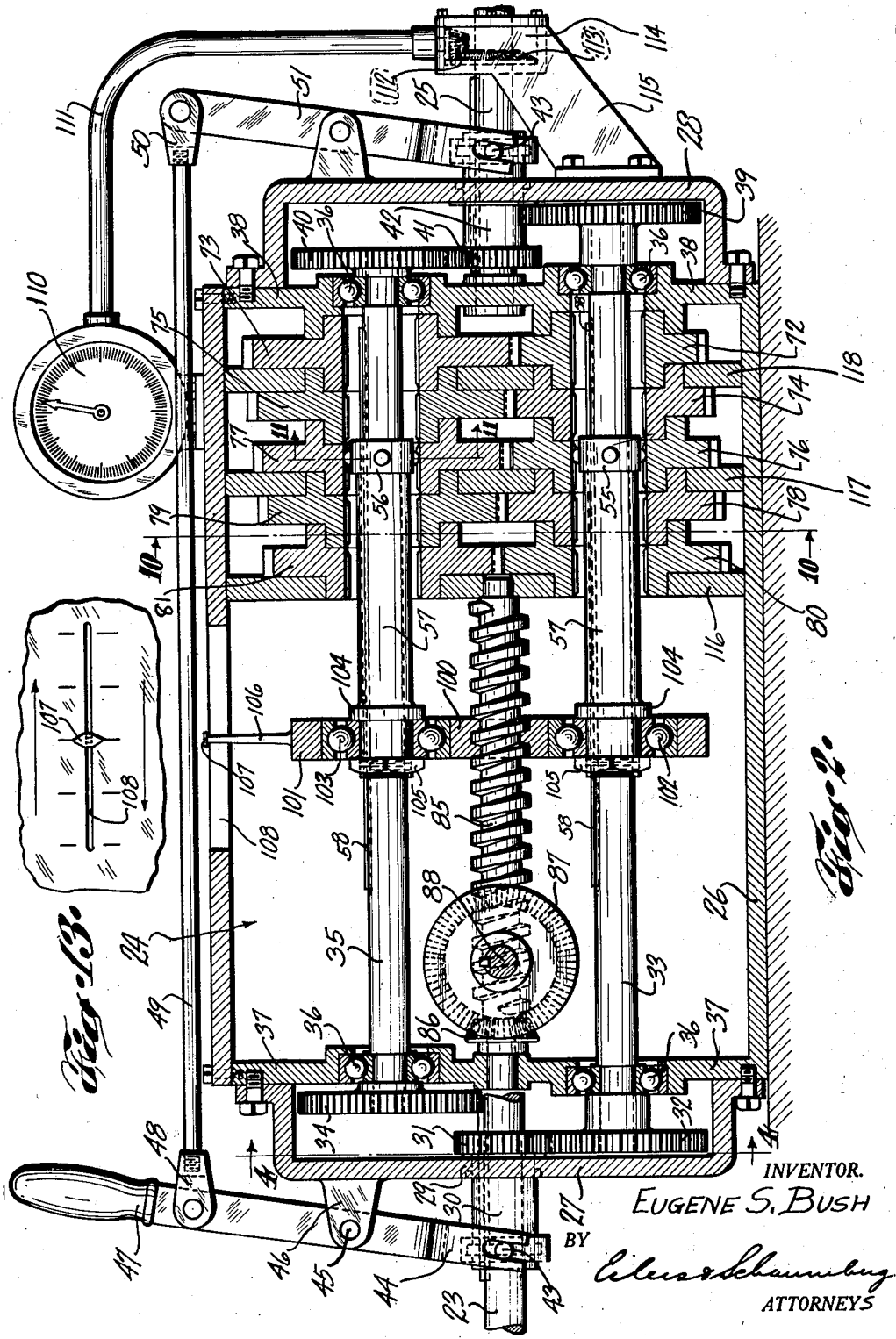

Dec. 18, 1934.  E. S. BUSH  1,985,017
VARIABLE SPEED TRANSMISSION APPARATUS
Filed Feb. 23, 1933  4 Sheets-Sheet 3
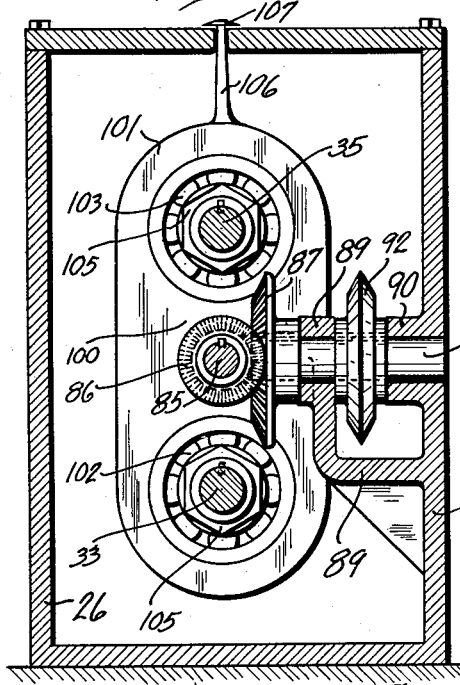
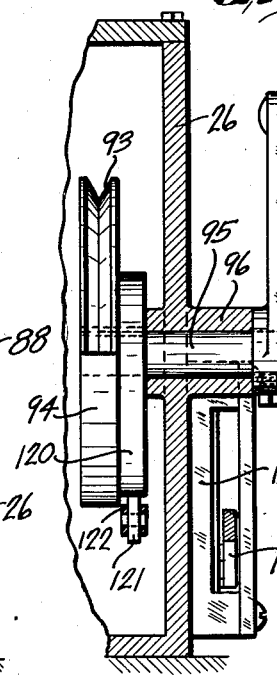
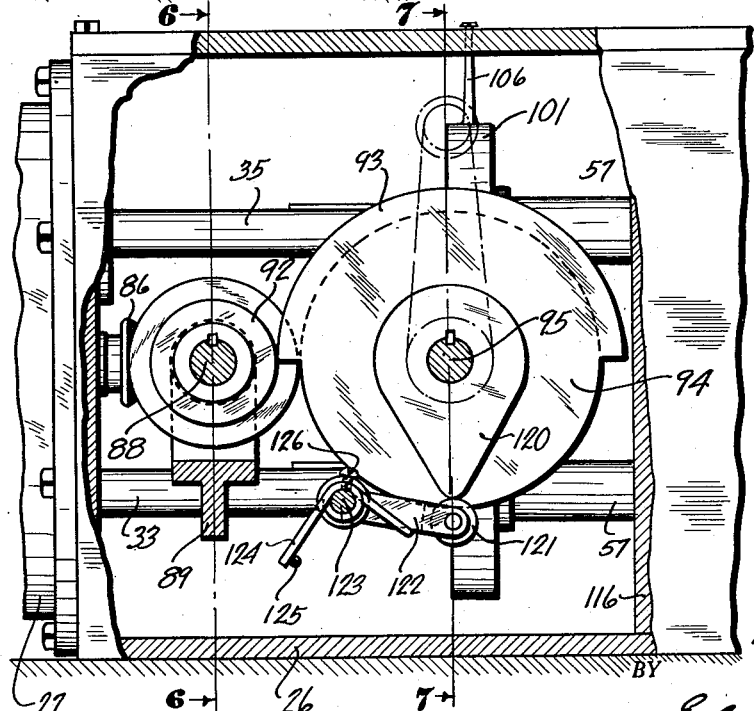
INVENTOR.
EUGENE S. BUSH
BY
ATTORNEYS

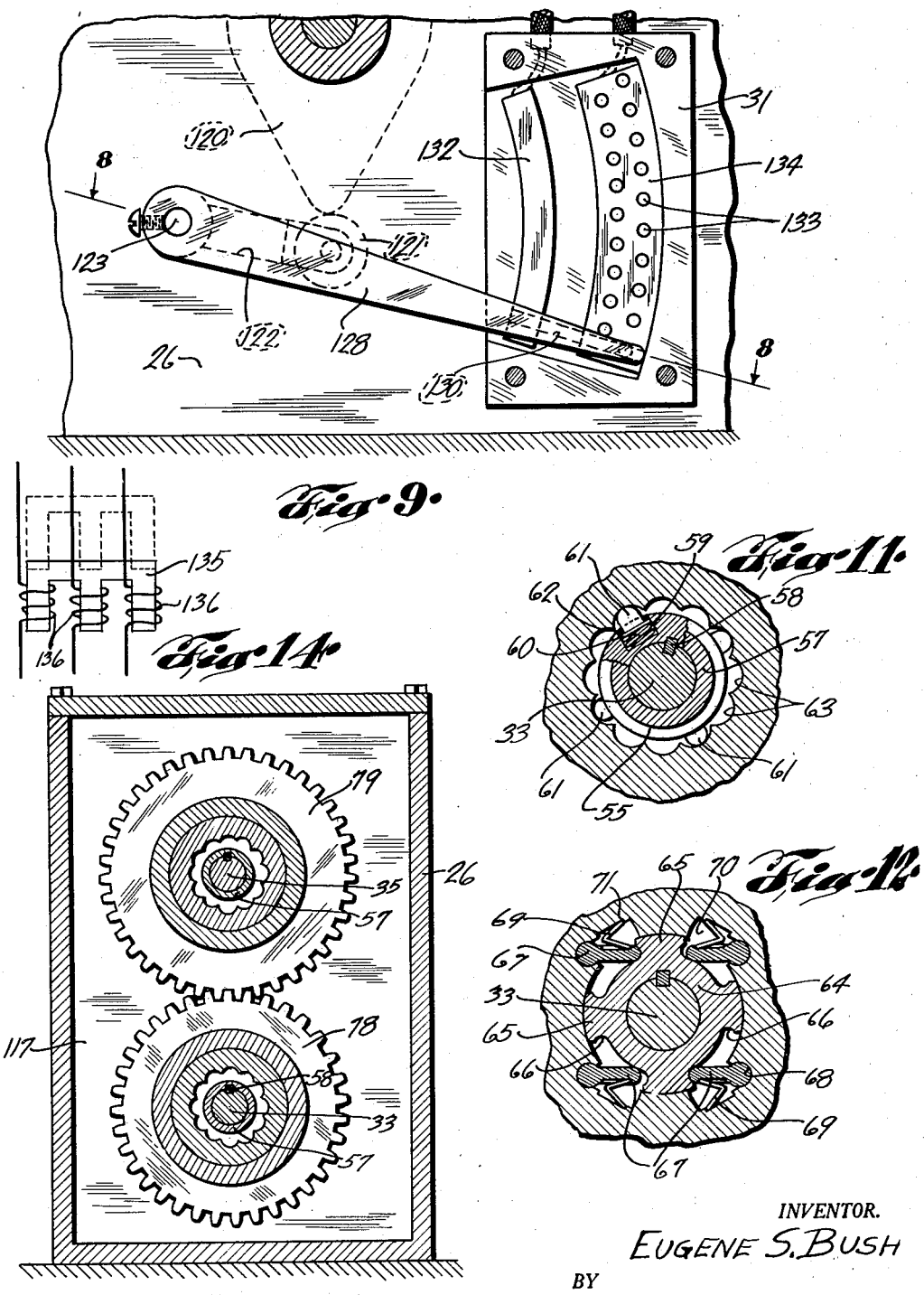

Patented Dec. 18, 1934

1,985,017

UNITED STATES PATENT OFFICE 1,985,017

VARIABLE-SPEED TRANSMISSION APPARATUS

Eugene S. Bush, St. Louis, Mo., assignor to Bush Manufacturing Company, St. Louis, Mo., a corporation of Missouri Application February 23, 1933, Serial No. 657,938

14 Claims. (Cl. 172—239)

This invention relates to improvements in variable-speed transmission apparatus, and more particularly to speed-control equipment adapted for use, in an assembled power unit, to enhance the range of speeds available from a prime mover, such as an electric motor, possessing but a limited range of speed control by variation of its own energy input.

An object of the invention is attained in an improved electro-mechanical power unit providing a greater flexibility of speed control through a coordinated system of electrical and mechanical regulation, whereby to attain a nicety of speed regulation of a power take-off member unattainable by individual utilization of either the electrical control or the mechanical control features.

Another object of the invention is attained in a speed-varying mechanism for use with an electric motor, and providing a substantially infinite variation of speed ratios between wide limits.

Yet a further object of the invention is attained in an improved mechanical transmission assembly for operative connection between a prime mover such as an electric motor, and apparatus driven thereby, such that the number of possible graduated speed ratios through the transmission, is considerably increased over prevailing apparatus employing a comparable number of gearing elements.

A still further object of the invention consists in the provision of a mechanical transmission, which may be of gear type, whereby the heretofore prevailing idle rotation of a number of the gears is avoided; this object being attained in the operation of only those gearing elements through which power is actually transmitted, thus considerably reducing heretofore prevailing frictional and other mechanical losses incident to the older types of transmission gearing.

Yet another object of the invention consists in the provision of a compact, simplified electromechanical power transmission unit, providing, with a minimum number of parts, an organization such that any desired operating speed, between limits, is available for power purposes, when utilizing standard types of prime mover, such as electric motors of commercially available designs.

Figure 4:
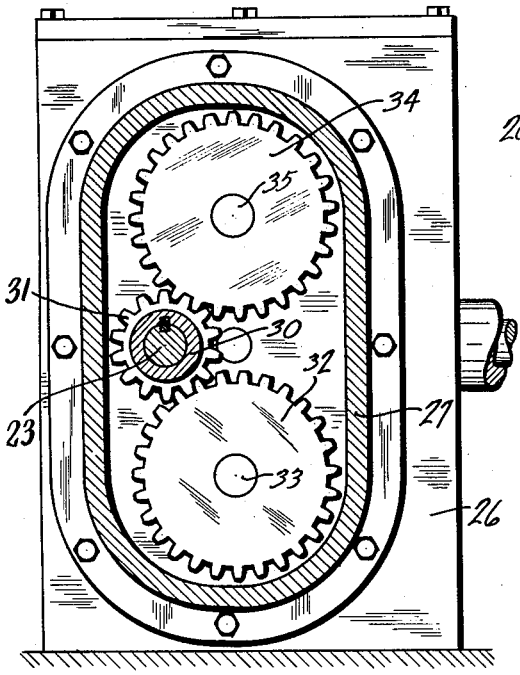
Figure 3:
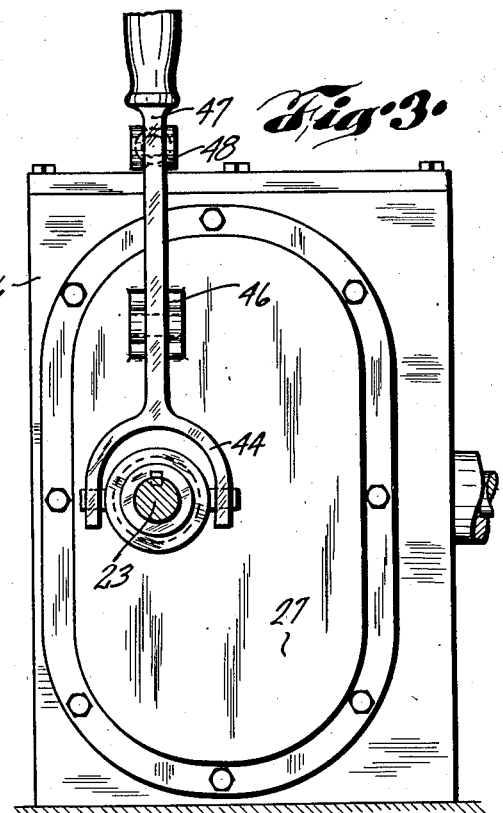

The foregoing and other objects will more fully appear upon consideration of the following description of a preferred embodiment of the invention, in connection with the accompanying drawings, in which:

Fig. 1 is a side elevation of a motor and transmission unit which may be of semi-portable type, and shown as mounted on a common base member; Fig. 2 is a longitudinal vertical sectional elevation through the transmission assembly of Fig. 1; Fig. 3 is an end elevation of the structure of Fig. 2; Fig. 4 is a vertical transverse sectional elevation as viewed along line 4—4 of Fig. 2; Fig. 5 is a vertical sectional elevation as viewed transversely of the transmission case, and showing certain elements of the control assembly; Fig. 6 is a transverse section elevation through the transmission case as viewed along line 6—6 of Fig. 5; Fig. 7 is a fragmentary vertical section as viewed along line 7—7 of Fig. 5; Fig. 8 is a fragmentary horizontal sectional elevation through the electrical control mechanism; Fig. 9 is a side elevation of the structure of Fig. 8, the relation of Figs. 8 and 9 being indicated by lines 8—8 and 9—9 respectively of the two figures; Fig. 10 is a vertical transverse sectional elevation as viewed along line 10—10 of Fig. 2; Figs. 11 and 12 illustrate, respectively, transverse sections through a gear clutch of a type employed for selectively interconnecting the paired gears of the transmission of Fig. 2, with the shafting of the transmission unit, Fig. 13 is a fragmentary plan view of the cover for the transmission case, illustrating a control-indicating device serving as a visible index to the several placements of the transmission control elements, and Fig. 14 is a partly schematic showing of a modified form of electrical motor-speed control.

Referring now by characters of reference to the drawings, the complete unit is shown as including a mounting support or base 15, at or near one end of which is secured a motor 16 as by cap screws 17, the motor adapted to be energized as through a junction box or other terminal connecting expedient (not shown) from leads or mains 18, the motor circuit being conveniently provided with a switch 19, and at least one of the legs of the circuit beyond the switch 19 being provided with a suitable line-energy control means, such as a rheostat indicated diagrammatically at 20 in Fig. 1, and hereinafter described in more detail. A motor shaft 21 is shown as connected through a flexible coupling 22 or its equivalent, to a power input shaft 23 of a mechanical transmission unit indicated generally at 24 (Fig. 1). The unit 24 is provided, conveniently at its opposite end, with a power take-off shaft 25, which serves to carry and actuate a power take-off pulley or gear (not shown) through which connection is had to any mechanism suitable to be driven by the unit.

The transmission unit 24 comprises a case 26 which is preferably oil-tight and so may serve to contain a supply of lubricant kept at a suitable level, for the purpose of splash-oiling the gearing and other parts within the case. The case 26 is preferably rectangular in transverse section, the body of the case being open at the ends, and the otherwise open ends being closed by plates 27 and 28. The end plate 27 may be provided with a suitable journal portion 29 in which is rotatably mounted the shaft 23, the journal portion serving to receive internally thereof, but externally of the shaft 23, an axially movable gear-shifting sleeve 30, to the end of which, and within the case, is secured a pinion 31 of somewhat smaller diameter than, and enmeshing with a gear 32 keyed or otherwise fixedly secured to a transmission shaft 33. A gear similar to the gear 22 is indicated at 34 and located at the same general end of the unit, the gear 34 being, by preference, of a diameter uniform with that of gear 32 and secured as by a suitable key or other means to a transmission shaft 35. The shafts 33 and 35, which may be considered as transmission countershafts, extend in parallel relation over the greater part of the length of the case, the two shafts being journaled at their opposite corresponding ends as in anti-friction bearings 36, carried by a bracket or bearing arm 37, at one end, and 38 at the opposite end. The brackets 37 and 38 may be formed, if desired, as integral parts of the body of the case 26 or may consist of separable partition elements detachably secured thereto.

The shaft 33 is provided at its end opposite the gear 32 with a corresponding gear 39, and the shaft 35 is likewise provided at its right hand end (Fig. 2), with a gear 40, which may be of the same diameter and other characteristics as the gears 32, 34 and 39. Shown as enmeshing with the gear 40 in Fig. 2 is a pinion 41 which may be of a diameter and other characteristics the same as pinion 31, the pinion 41 being secured to a shiftable sleeve 42, like the sleeve 30, the sleeve 42 overlying and being keyed to the power take-off shaft 25. It will have been observed from Fig. 2 that shaft 35 is of somewhat lesser length than shaft 33, so that the gears 32 and 34, and the gears 39 and 40 are respectively staggered endwise of the unit and thus only one of these gears at a given end of the case is engageable at one time by the pinion 31; likewise only one of the gears at the opposite end of the case is engageable at a given time by pinion 41.

Provision is made, through the sleeves 30 and 42, for concurrently shifting the pinions 31 and 41, by providing each sleeve with diametrically extended trunnions 43 on each sleeve, and thus each sleeve 30 and 42 is shiftably engaged by the slotted ends of a shifting fork, the fork at one end being shown at 44, pivoted as at 45 to a lug 46, the shifting fork 44 being outwardly extended to form a handled lever portion 47. The lever 47 is pivotally connected by a yoke 48 to a reciprocable rod 49, thence through a similar yoke 50 to a shifting lever 51, which conveniently corresponds to the element 44—47, except for the omission of the handle. It will clearly appear from Fig. 2 that with the control handle 47 in the position shown, the pinion 31 engages gear 32 and pinion 41 engages gear 40.

Thus assuming the motor shaft 23 to be rotated in a given direction, the shaft 23 becomes, as far as the transmission proper is concerned, the driving shaft, and through the speed change gear train, hereinafter described, serves to actuate shaft 25 as a driven shaft. The path of the driving energy is thus from shaft 23, through gears 31, 32, shaft 33, thence through the speed change gear train to shaft 35, gear 40, and pinion 41 to the power take-off shaft 25, all in the order named.

It will appear, however, that when the lever 44 is moved as by handle 47 to the left (Fig. 2), due to shifting of pinion 31 into engagement with gear 34, driving actuation takes place from shaft 23 through gears 31, 34 and shaft 35 as a driving transmission element. The shaft 35, through the speed change gear train, now serves to actuate shaft 33 as a driven transmission element. Pinion 41 having been shifted concurrently with pinion 31, power is transmitted through gears 39 and 41, to the power take-off shaft 25.

Proceeding now to a description of the speed change gearing associated with shafts 33 and 35, there is provided on each of these shafts, a gear clutch or driving head, such as 55 on shaft 33, and 56 on shaft 35. The heads 55 and 56 are carried each by a sleeve 57, splined or keyed to the associated shaft. The heads may be formed as integral parts of the associated sleeves, or formed separately and secured to the sleeves. According to the capacity and torque requirements of the unit these gear clutches may take either of the forms illustrated by Figs. 11 or 12.

In Fig. 11 the gear clutch is shown as including a sleeve 57, keyed as by a locking element 58 to the shaft such as 33. The gear clutching portion of the sleeve is provided with radial recesses, one of which is shown at 59, serving to contain a spring 60 which urges outwardly a plunger 61, provided with a convexly rounded outer end, and restrained in its outer movement as by a plug 62 which may be threaded into the outer end of the recess 59. Each of the individual gears of the train is arranged to be internally engaged by the gear clutch, and is provided with a central or axial bore, characterized, according to Fig. 11, by a scalloped inner periphery, the individual indents 63 being rounded to conform generally to the outer ends of the plungers 61. It thus appears that the spring-pressed plungers serve to effect an operative engagement between the shaft by which the clutch or head is carried, and the individual gear into the bore of which the head is selectively movable by means hereinafter described. The indents 63 are preferably in the form of a segment of a cylinder and of a trend along or parallel to the axis of the gear so formed.

In the case of units of greater torque requirement, the arrangement of Fig. 12 is to be preferred, according to which the head 64 is characterized by a plurality of radial abutments or arms 65, each laterally and arcuately undercut, as at 66, so as to receive, in seating relation, tangentially arranged pawls 67, the outer ends of which are convexly curved so as to fit within the recesses 66. Each of the pawls 67 is formed with an integral pivot portion, carried within a corresponding journalling recess 68 within one of the gears. Each of the pawls 67 is urged inwardly of the bore in the associated gear as by a spring 69, there being provided for each pawl and its associated spring, a pocket 70 provided with a spring positioning notch 71, the pockets being so proportioned that the pawls 67 may be deflected outwardly of the bore so as to permit a free axial or endwise movement of the head through any given gear. The ends (not shown) of the head 64 are preferably so arranged that as the head approaches the bore of a given gear, the initial effect is to deflect the pawls 67 outwardly, and thus preclude any interference with a free axial or shifting movement of the gear clutch elements.

The train or trains of speed change gears are arranged in two groups, each group being coaxial with one of the shafts 33—35. Those of the first group associated with shaft 33, are indicated in the order of their diameter and number of teeth, at 72, 74, 76, 78 and 80, and mesh respectively and in order with gears 73, 75, 77, 79 and 81. There are thus provided in the example shown, five pairs of gears, the even numbered gears of the one group enmeshing respectively with the odd numbered gears of the companion group. While I have shown for purposes of illustration, five pairs of gears, providing a series of graduated gear ratios, it will be understood that any desired practical number of the companion gears may be utilized, according to the required range of speed ratios to be obtained through mechanical control. It will appear from the comparison of diameters of the several sets of paired gears in Fig. 2, that the greatest difference in diameter and hence the greatest reduction or increase in gear ratios, is available between the paired gears 72 and 73, the ratio between the paired gears being less in proceeding through the several pairs, the minimum mechanical ratio being provided between gears 80 and 81 which are, however, by preference, not identical as to number of teeth.

Proceeding now to a description of a preferred mechanical agency whereby the two gear clutches or heads 55 and 56 are concurrently shifted, each into one of the selected pair of gears, there is indicated at 85, a worm shaft or screw provided preferably near one end with a pinion such as a bevel pinion 86. (Fig. 2). Enmeshed with the bevel pinion 86 is a bevel gear 87 secured to a shaft 88 journalled at one end in an inwardly extending bearing bracket 89, and at its opposite end in a journal projection 90 in one wall of the case 26. The shaft 88 serves to carry a friction wheel 92, provided with a beveled or apexed periphery and adapted to be engaged by a correspondingly grooved arcuate portion 93 of a disc 94, (Figs. 5 and 7). The disc 94 is secured to a shaft 95 projecting outwardly of the transmission case and journalled in a boss 96 in one of the case walls. The outer end of shaft 95 is provided with a crank 97, provided with a handle 98. Thus it appears that, as the crank 97 is actuated within a portion of its circular range of movement, the corresponding rotation of shaft 95, discs 94 and 92 and gear 87, serve to rotate the screw 85.

Positioned for movement axially of the screw or worm shaft 85, is a travelling nut 100, forming a central portion of a bracket 101, shiftable endwise of the transmission by means of the parts 85 and 100. The bracket 101 is provided with apertures containing anti-friction bearings 102 on the sleeve associated with shaft 33, and 103 on the sleeve carried by shaft 35. The bearings are kept in place relative to the sleeves as by collars 104 which may be formed integral with the sleeves, together with nuts 105, each engaging the side of the associated bearing opposite the collar 104, and threadedly secured to the end of the corresponding sleeve.

In order to apprise the operator of the setting of the bracket 101 and hence of the gear clutches 55 and 56, the bracket 101 is provided with an index arm 106 terminating outwardly of the case in a pointer 107, the arm 106 serving to operate through a slot 108, in one wall, say the top of the case 26. My preference is to provide the opposite sides of the slot 108 with suitable indicia showing, according to each direction of movement of the bracket 101, the various speed positions of the transmission.

Since a unit of the present order is admirably adapted to the driving of machine tools and like equipment, in which a number of definite driving speeds are desired for different operations, it has been found desirable to provide the power take-off shaft 25 with means affording an instantaneous index of its speed. The present example discloses this agency as consisting of a tachometer 110 driven as by a flexible shaft operating in a housing 111 therefor, the shaft being actuated by a bevel pinion 112 from an enmeshing gear 113 secured to the shaft 25. The tachometer drive, particularly the gears 112 and 113 is conveniently disposed in a housing 114 therefor, carried by a bracket 115 and secured, say to the end plate 28, of the case 26.

With particular reference to the features distinguishing the present transmission unit, per se, from the heretofore prevailing types of gear transmission units, it is to be noted that, as the screw shaft 85 is rotated and the bracket 101 shifted endwise of and within the case, the gear clutch heads 55 and 56 are always, in the example described, kept in substantially the same vertical plane. Assuming that the heads 55 and 56 are in their operative or clutching positions respectively within the gears 72 and 73, and that the shaft 33 is in the relation of a driving transmission element, the lowest available transmission speed will be imparted to shaft 25. As, however, the bracket 101 is so moved as to bring the heads 55 and 56 within the gears 74 and 75, the speed of shaft 25 will be somewhat increased, other conditions remaining the same, and so on in succession as the clutch heads are moved successively to the left (Fig. 2), into or through the paired, enmeshing, associated gears. When the head 55 occupies the bore of gear 80, and the head 56 the bore of gear 81, the highest possible speed of shaft 25 may be attained when utilizing the shaft 33 as the driving transmission element. It will appear, however that the situation becomes altered when, by movement of handle 47, shaft 35 becomes the driving, and shaft 33 the driven transmission shaft, and that the driving-driven relation of the speed change gears becomes relatively the reverse of that described. Assuming gear 80 to be somewhat smaller than gear 81, a still higher output speed now becomes available for the same position of the bracket 101 and heads 55 and 56. In order to obtain a series of successively higher speeds of shaft 25, through the agency of the transmission unit, the handle 98 is turned in a direction opposite to its first described control movement, so as to move the bracket 101 to the right, (Fig. 2), and in turn, the gear clutch heads are moved into the gears 78—79, thence in succession into and through the bores of gears 76—77, 74—75, are again brought in turn, within the gears 72 and 73. In this position, the shaft 35 still being the driving shaft, the highest possible speed is available, for power output purposes, to shaft 25.

It will be noted that the axial length of the heads 55 and 56 is less, in each case, than the length of the driving parts of the bores in the individual associated gears, the relation being such that it is impossible for the heads to bridge the gears and thus create any adverse shearing stresses between the gear and shafts.

From the foregoing it will appear that, among other advantages, there result two points of distinct superiority over conventional transmissions, viz., for a given position of the controls identified with the placement of bracket 101, only a single pair of the speed change gears are operative as power transmitting elements. The remaining gears of the speed ratio train being static, are not frictionally absorbing the input energy and are not further dissipating this energy in the displacement, say of a heavy gear case lubricant. A second distinct advantage results in the fact that, contrary to prevailing practice, through the means for varying the driving-driven relations of the shafts 33 and 35, a group, say of five enmeshing pairs of gears, provides double that number of successive speed ratios, in the present example ten such ratios being afforded by the five pairs of gears. The unit is thus rendered very compact and the space requirements of the parts kept at a minimum.

It will be noted that the speed ratio gears are, in a measure, self-journalling, due to their lateral projections of staggered diameter according to which each of the gears of the train is journalled partly in or upon its companion, and the groups of the train as a whole, being journalled in and positioned by a plurality of spaced parallel brackets 116, 117, 118 and the plate 38.

My preference in the construction of the mechanical transmission units, when coordinated with an electrical motor speed control, is so to select the ratios afforded by the paired speed change gears that an even speed increment or decrement is afforded between the successive speed placements. For example, in the utilization of a motor, say 1500 R. P. M., in case it is desired to provide a range of speeds from 500 R. P. M. to the full motor speed, the ten speed ratios available through the described transmission would vary from each other by 100 R. P. M. Thus the graduated ratios available will be, say 600 R. P. M., 700 R. P. M., etc., to the top speed of 1500 R. P. M. It will appear that, by providing a suitable number of the paired gears there will in many cases result a satisfactory range of speeds which are graduated sufficiently closely to obviate the requirement of any adjunctive electrical control, except for a switch, starting equipment or such separate apparatus as may ordinarily be utilized. In case, however, it is desired to effect an infinite variation of speeds of the power take-off shaft, between the upper and lower limits, it is my preference to utilize, as unified with the mechanical speed change control of the transmission, an electrical control unit directly affecting the speed of the motor 16.

In the example illustrated the mechanical elements of this control include a cam 120, secured as by a key to the shaft 95, which, as before noted, is actuated by the handled crank 97. The cam 120 is in the example shown, of symmetrical profile so as to produce a similar control action, irrespective of the direction of its manual rotation. The cam 120 is engaged by a roller 121 constituting a cam follower, this roller being carried by a pivoted arm 122, pivoted by means of an element 123, which serves to carry a torsion spring 124 engaging at one end a stop 125, the other end of the spring bearing on the arm 122 in a direction always to keep the roller 121 adjacent the face of the cam 120. The arm 122 is secured to the shaft 123 as by a set screw 126. The shaft 123 is journalled conveniently in a bearing portion 127 in one of the side walls of the case 26, and where it projects outwardly of its journal, serves to receive an electrical control arm or lever 128 which may either be formed of insulating material, or provided with an insulated outer end 129, as shown, serving to carry movable contacts 130. The outer or free end of the control arm 128 carrying the contacts, projects through a lateral slot in a housing structure formed preferably of insulating material, and indicated at 131. Disposed within the housing is a contact 132 of arcuate form (Fig. 9), and a plurality of button contacts 133, carried by an insulating base 134 after the manner, say of the usual rheostat contacts. Interconnection of the contact 132 and the several contacts 133 by the element 130, as the arm is moved, serves gradually to increase or decrease the resistance in the motor feeder circuit 18, the circuit relation of the variable resistance being indicated diagrammatically at 20 (Fig. 1).

While the structure of the electrical control has been heretofore described with reference to a variable resistance or rheostat, the suitability of this type of control will depend upon the type of motor employed, according to whether the motor be of direct current type, or of single phase or polyphase type, or of slip ring type, or whether the motor is of the more usual induction or squirrel cage variety. Accordingly, the variable resistance illustrated at 20 is intended to be only illustrative of a variety of known types of electrical speed control.

It will have appeared from previous description that the variable resistance 20, or an equivalent thereof, provides the requisite variation in speed of the motor, through control of its input energy. The preferred angularly opposed relation of the disc 94, and the nose of cam 120, as will best appear from Fig. 5, is such that, as the shaft 95 is rotated in a given direction, the control operations effected by the elements 94 and 120, effects an alternate control of the transmission elements, and the motor speed. As the crank 97 is rotated, for example to the left to move the parts in a counter-clockwise direction (Fig. 5), the grooved portion 93 rotates the disc 92 with a preliminary effect of shifting the bracket 101 and the clutch heads 55 and 56. During this time, the nose of cam 120 will have permitted the arms 122 and 128 to resume their initial positions. A continued movement of the shaft 95 serves, through elements 94—92, to move the gear clutch heads 55 and 56 into effective connection with one of the pairs of gears of the transmission unit. It thus appears as my preference that effective gear and gear clutch connections are deferred until the contact arm 128 has been restored to an end position of rest. The gear change control member having now been placed in a predetermined setting, a further part revolution of the disc 94, while not effective to change the gear setting, causes the nose of cam 120 to displace the shaft 123, and hence also the contact arm 128. As a result of the latter movement, the motor speed is controlled to the desired extent to provide any required speed of shaft 25 between those speeds afforded by the step-by-step control placements of the transmission. Since a full range of speed ratios through the transmission is attained by movement of the bracket 101 in opposite directions, a cycle of control movements similar to that heretofore described, will take place as the crank 97 and shaft 95 are rotated in a direction opposite to that described, it being understood however, that the latter parts are susceptible of movement in either direction at any time to attain any desired speed of the shaft 25, within the range determined by the transmission control settings.

Thus it will appear that as the control crank is rotated in a given direction, there results a sequence of speed change control movements intervened by a series of motor speed control movements, all obtainable through manipulation of the crank 97. In proceeding in order through the ten available speed change ratios, movement of the bracket 101 will first take place from right to left (Fig. 2), employing the shaft 33 as a driving shaft. Thereafter the direction of actuation of crank 97 will be reversed and the bracket 101, together with heads 55 and 56, moved from left to right, employing the shaft 35 as a driving shaft and there is thus afforded the desired infinite variety of speeds, between prescribed limits, of the power take-off shaft 25.

The use of a rheostat or variable resistance unit has been found satisfactory in the case of polyphase motors of slip ring types, among others. Wherever the prime mover consists of an induction motor, say of polyphase squirrel cage type, I have found it advantageous to utilize a motor characterized by a high reactance secondary or rotor, together with a variable inductance in the primary circuit of the motor, such a variable inductance being shown diagrammatically by Fig. 14. In the latter case the control arm 128 may be pivotally connected to a movable core, and the angular movement of arm 128 will be utilized to vary the inductive relation between a core element or elements 135, and the associated windings 136. The elements 135—136 will, in effect, constitute a variable inductance-reactance, and thus provide a requisite range of motor-speed control by variation of effective input voltage.

In certain installations requiring a frequent transition from a low speed to a very high speed, the cyclic actuation of the rheostat or inductance between each successive step of transmission control, is rendered unnecessary. Accordingly, I may provide a clutch (not shown) of simple type, for readily disconnecting cam 120 from the control shaft, or in lieu thereof, a switch 140 (Fig. 1) may be employed to shunt out the electrical control during the period of progressing through a number of transmission speed ratios.

In operation it will appear that the operator having noted the direction of movement of bracket 101 as last effected by the crank 97, considered in connection with the position of handle 47, is enabled by virtue of the direction-indicating arrows and indices of Fig. 13, to follow one or the other of the scales along the slot 108. The arrows and the speed ratio indication as coordinated with the position of pointer 107, apprises the operator of the internal control placements of the transmission unit, necessary to approximate the desired speed of shaft 25. If the tachometer does not show the specifically desired speed of shaft 25, this may then be obtained by manipulation of the crank 97 to vary either the rheostat or the variable inductance to a degree resulting in any desired rate of rotation of shaft 25 within the end limits resulting from any given control placement of the transmission.

It will appear that the device as heretofore described in detail affords a number of advantages in flexibility and facility for wide selection of speed controls in connection with electrical drives, further that it is simple and sturdy in construction, dependable in operation and highly efficient, in that it minimizes internal frictional loss and also fully attains in every other respect, each of the several objects hereinabove specifically set forth.

While the invention has been described by particularizing the structure of a specific exemplary embodiment, such a description is not to be understood in a limiting sense, since numerous changes may be made in the parts, their combinations, as well as in the application or use of the unit, without departing from the full intended scope of the invention as defined by the appended claims.

I claim:

1. In combination with an electric motor, a speed change transmission unit of gear type, and a manually actuated mechanical control organization common to said motor and transmission unit, and including intermittent control connections, one functionally associated with the motor, and another mechanically associated with the transmission unit for purposes of speed ratio selection, and a common actuating member for said control connections, said connections being operable by the actuating member, each independently of the other.

2. In a power unit, in combination with an electric motor, a power shaft driven thereby, a speed-change gear unit operatively connected to said shaft, a manual control lever, an intermittently operable mechanical connection between the lever and control elements of said gear unit for progressively varying the speed ratio through the unit, motor speed control means, and an intermittently operable connection from the lever to said control means, said intermittent connections each being operable by said lever as the other is inoperative.

3. In an electric power unit, the combination with an electric motor including a motor shaft, of a plurality of speed-change gears and gear shafts adapted to be driven selectively from said motor shaft, means in speed controlling relation with the motor, means for selectively interconnecting said gears and gear shafts, and a control element common to said means, said means including connections precluding effective actuation of the motor speed control means by the control element while operable to select the connections between gears and gear shafts.

4. In an electric power unit, in combination, an electric motor, a motor speed-controlling device, a speed-change gear unit in driven relation to said motor, a manual control member, a mechanical control means including an interrupting drive connection from said member to the gear unit, and electro-mechanical means including an intermittent drive connection between said control member and the motor speed-controlling device, for varying the motor speed, said means including elements determining a sequential actuation of said drive connections.

5. In combination with an electric motor, a speed change transmission unit, a manual control organization common to said motor and transmission unit, said control organization including a control lever, a mechanical connection to the transmission unit, operable by the lever for effecting a step by step change of power take-off speeds through the transmission unit, and an electromechanical device arranged to produce a variation of motor speed, intervening said stepped speed changes, and responsive to movement of said lever in a given direction.

6. In combination in a power unit, an electric motor, a speed-change transmission arranged to be driven by the motor, a control organization common to the motor and transmission and including a manually rotatable shaft, an axially movable speed change control element in the transmission, an intermittent drive for translating the rotary movement of said shaft to actuate said transmission control element, a variable resistance unit in the motor circuit, and intermittent drive means providing for control of said resistance unit responsively to rotation of said control shaft and intermittently with respect to the actuation of the transmission control element.

7. In an electric power unit, an induction type motor, a speed-change transmission arranged to be driven by said motor, a variable inductance unit in the motor circuit, a manual control shaft adapted, selectively, for the control of said transmission and of said inductance unit, and mechanical control connections arranged, respectively, between the said shaft and transmission, and between the shaft and inductance unit, said connections being intermittently and alternately operable in response to a given control movement of the control shaft.

8. In a variable speed electric power unit, an electric motor, a speed-change transmission arranged to be driven by the motor, a rotary control shaft, a wheel element driven by said shaft, means for translating the movement of said wheel element to effect a speed change control of said transmission, a cam rotatable with said control shaft, a cam follower, a lever actuated by said follower, electrical means in speed-controlling relation with the motor and controllably associated with said lever, the said wheel element and cam having their active operative portions angularly so disposed with respect to each other and with respect to said translating means and cam follower whereby a given rotation of said control shaft serves to effect speed change control placements of said transmission, and an alternate cyclic speed control of said motor, in response to rotation of said control shaft through a predetermined range, and in a constant direction.

9. In combination with an electric machine, a speed change transmission unit of gear type, a mechanical control organization common to the machine and transmission unit and including intermittent control connections, one electrically associated with the machine, and another mechanically associated with the transmission unit for purposes of speed ratio selection, and a common actuating member for said control connections, said connections being operable by the actuating member, each independently of the other.

10. In combination with an electric machine, a speed-change transmission unit connected to the machine, a control organization common to the machine and transmission unit, said organization including a control lever, a mechanical control connection to the transmission unit, operable by the lever for effecting a step by step change of speed ratios through the transmission unit, and an electromechanical device arranged to control the circuit of the machine, intervening said stepped speed changes, and responsive to movement of the lever in a given direction.

11. In a power unit, in combination with an electric machine, a power shaft connected to the machine, a speed-change gear unit operatively connected to the shaft, a control lever, a mechanical control connection of intermittently-operating type, between the lever and gear unit, arranged for progressively varying the speed ratios through the unit, control means for the electric machine, and an intermittently operable connection from the lever to said control means, said intermittent connections each being operable by said lever as the other is inoperative.

12. In combination in a power unit, an electric machine, a gear type speed-change transmission operatively connected to the machine, a control organization common to the machine and transmission and including a control shaft, gear-clutching elements movable into selecting relation with certain of the transmission gears, means for actuating the clutching elements, means for electrically controlling the machine, and connections by which said means are independently operable by the control shaft, each in a distinct range of control movement of the shaft.

13. In combination in a power unit, an electric machine, a speed-change gear type transmission operatively connected to the machine, a control organization common to the machine and transmission and including a rotatable control shaft, speed change control elements in the transmission movable axially into selecting relation with the transmission gears, means, operable as the shaft moves over a portion of its range of movement, for electrically controlling the machine, and means, operable as the shaft moves over another portion of its range of movement, for actuating the speed change control elements independently of electrical control of the machine.

14. Control apparatus for a power unit including an electric machine and an operatively connected speed change unit, the control elements including a rotatable control shaft, two elements carried by the shaft, control connections from one element to the speed-change unit, connections from the other element for controlling the electric machine, each of said elements and its connections being operatively associated only through a restricted range of movement of the control shaft, and operable within such range independently of effective actuation of the other element and its associated connections.

EUGENE S. BUSH.